Feb. 11, 1969  J. A. DANIEL, JR  3,426,994
STRAIGHT LINE CARRIER DEVICE
Filed Dec. 12, 1966

INVENTOR
James A. Daniel, Jr

BY Lourover & Browdy
ATTORNEYS

Feb. 11, 1969 J. A. DANIEL, JR 3,426,994
STRAIGHT LINE CARRIER DEVICE
Filed Dec. 12, 1966 Sheet 3 of 3

INVENTOR
James A. Daniel, Jr.
BY Tourover & Browdy
ATTORNEYS

United States Patent Office 3,426,994
Patented Feb. 11, 1969

3,426,994
STRAIGHT LINE CARRIER DEVICE
James A. Daniel, Jr., R.D. 2, Box 66,
Newton, N.J. 07860
Continuation-in-part of application Ser. No. 469,175,
July 2, 1965. This application Dec. 12, 1966, Ser.
No. 601,096
U.S. Cl. 248—277                 9 Claims
Int. Cl. A47f 5/12; F16h 21/10

ABSTRACT OF THE DISCLOSURE

The present disclosure relates to a straight line carrier device and may find a variety of uses such as a gauging instrument, scaffolding, doors, etc. The device utilizes a pair of joined parallelograms which move, relatively, in opposite directions changing their shape as they move. In order to maintain the movement of the two parallelograms in the proper relation to one another, a suitable means must be provided, such as suitable spacing rods and pivoted linkages, sliding pins, or gear wheels.

---

This is a continuation-in-part of my co-pending application, Ser. No. 469,175, filed July 2, 1965, now Patent No. 3,291,431.

The present invention relates to a straight line carrier device, and more particularly, a device for supporting a movable object in relation to a stationary object or another movable object, which objects can reciprocate in a straight line via the use of swinging parallelograms, wherein such supporting device does not utilize rollers or members sliding in relation to one another and whereas the device is not restricted to the length of its own dimension for length of carriage, i.e., it may expand and contract.

Straight line carriers and supporting devices in general are well known and serve a great variety of purposes. Thus, for example, pivoted crosses, e.g., "lazy-tong" devices, are linked together and used for a variety of purposes, such as the provision of expandable and contractable gates. Telescoping devices are often used to move one member towards and away from another, for example, moving the lens from the eye piece in a telescope. Rollers, roller bearings, or ball bearings are often used, sometimes in a track, to enable one member to slide with respect to another member, such as a desk drawer or a sliding door. Similiarly, doors and drawers are often provided in a track and slide in direct contact with the track. Worker carrying scaffolding which must be moved vertically in a straight line is normally supported by rigid elements. Various gauges used for mathematical and/or measuring work and similar instruments normally use sliding elements.

All of such conventional straight line carriers, however, suffer from defects which often cause breakage or jamming, and are subject to excessive friction. Thus a pivoted cross linkage device requires a pair of lost motion slots in both the support member and the movable member and these points often become loose and wear out much quicker than the remainder of the device due to excessive friction, and, in addition, are subject to fouling by foreign materials. Direct sliding fixtures, such as telescoping devices and sliding doors or drawers are limited in their length of movement to the invariable length of their support and are also subject to wear and fouling, as well as binding. Rollers and bearings are also subject to fouling, and, in addition, are generally relatively expensive.

It is therefore an object of the present invention to overcome the problems of the prior art, such as those indicated above.

It is another object of the present invention to provide a straight line carrier device which contains no sliding or rolling members.

It is another object of the present invention to provide a straight line carrier device which is moved solely through pivot points.

It is another object of the present invention to provide an apparatus which will move any object in a straight line towards and away from any base.

It is another object of the present invention to move one object from another in a straight line solely through the use of pivots and suitable linkages and without the necessity of providing slides and/or rollers.

It is another object of the present invention to move one object from another in a straight line for a greater distance than the dimension of the carrier device, i.e., to provide a carrier device which can expand and contract as it carries.

It is another object of the present invention to provide for two or more mounting points for objects.

It is another object to construct a device that requires no base or support other than the objects to be moved.

It is another object of the present invention to traverse one object in relation to another object or base in a straight line as one object is moved towards and away from the other object.

It is another object of the present invention to join two support structures with suitable pivots and to link to provide one expandable and contractable unit.

It is another object of the present invention to move an object in a straight line in relation to another object with the straight line carrier device operating from any position.

It is another object of the present invention to provide a simple-to-operate and highly effective apparatus for accomplishing the above objects, which apparatus is relatively inexpensive and simple to produce.

Other objects and the nature and advantages of the instant invention will be apparent from the following description and a description of an exemplary embodiment of the invention taken in conjunction with the accompanying drawings, wherein.

Figure 1:
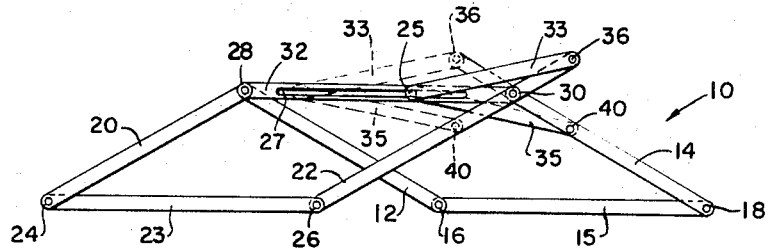
FIG. 1 is a front elevation of a device in accordance with the present invention.

Noting FIG. 1, a straight line carrier device 10 is shown comprising a first arm 12 and a second arm 14, both mounted on a base member 15 via pivots 16 and 18, respectively. Similarly, a third arm 20 and a fourth arm 22 are pivotally mounted to a movable member or traveler 23 via the pivot points 24 and 26, respectively.

The arm 20 is in turn pivotally mounted to the arm 12 at a pivot 28, and similarly the arm 14 is pivoted to the arm 22 at a pivot 30. A spacing rod 32, containing an elongated slot 27, connects the two pivot points 28 and 30.

In the embodiment 10 it is clear that the distances between the pivots 24–28, 16–28, 26–30, and 18–30 are all equal (i.e., arms 12 and 20 are of equal length), and this is essential to obtain straight line movement. However, the traveler 23 and the base 15 will be mounted in different horizontal planes if elliptical, rather than straight line movement is desired.

Figure 6:
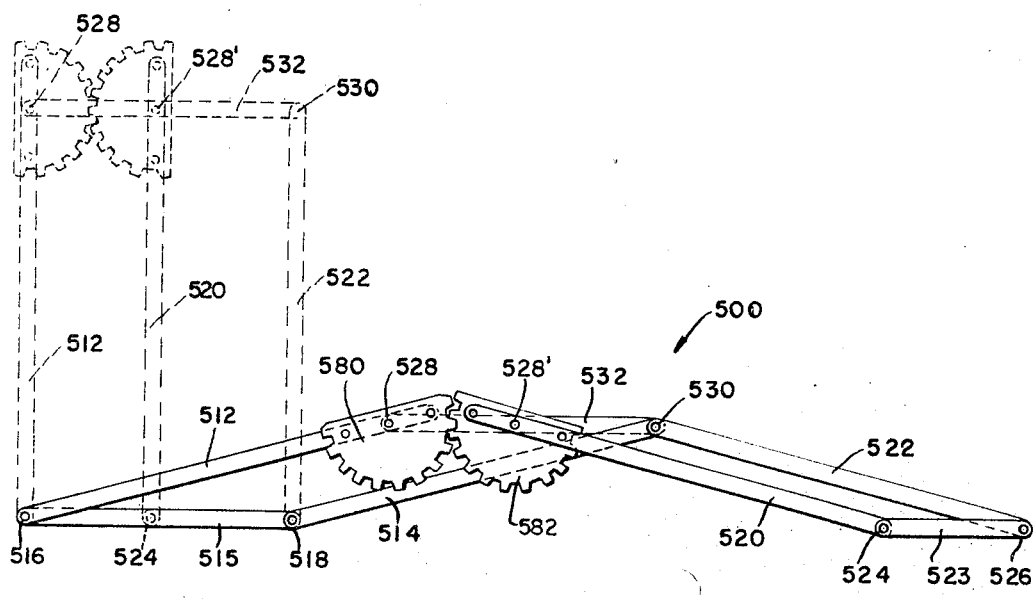
FIG. 6 is a front elevation of a sixth embodiment, analogous in certain respects to the embodiments of FIGS. 1–3.

Although the separation of the pivot points 24 and 26 is equal to the separation of the pivot points 16 and 18 in the device 10, this also is not necessary. However, since the arm 20 must always be parallel to the arm 22, and the arm 12 must always be parallel to the arm 14, thus maintaining a pair of swinging parallelograms whose shape constantly changes it during movement, it will be clear that if the spacing between the pivots 24–26 and 16–18 were not equal, the additional pivot point would have to be placed along the length of the slotted rod 32. FIG. 6, discussed in greater detail below, illustrates such a construction.

In the device 10, the slotted rod 32 forms the fourth side of each of the two swinging parallelograms. One parallelogram is formed by the arms 20 and 22, the traveler 23 and the slotted rod 32. The other parallelogram is formed by the base 15, the two arms 12 and 14 and the slotted rod 32. It is clear that the devices of the present invention, such as device 10, are relatively planar and, in use, are often provided in pairs. Assuming the base 15 is anchored, the traveler 23 may move in a straight line from the position shown in FIG. 1 at the left of base 15, in a straight line past the base 15 to a position on the right of the base 15 in a manner shown in FIGS. 5 and 10 of my parent application, Ser. No. 469,175. As can be contemplated, the traveler 23 could be a sliding door and the base 15 could constitute a wall or the floor.

A critical and essential feature of the present invention is the provision of a suitable means to maintain the swinging of the two parallelograms equal to one another. Regardless of the relative size of each of the parallelograms, in order to maintain the movement of the traveler 23 in a straight line it is necessary to provide such a maintaining or holding means. Such a means may be best understood by describing the relative rotation of one pivot about another pivot. Thus, for example, considering pivot 28 to be a stationary point (contrary to actual use), the pivot 24 will rotate about such pivot 28 in a counterclockwise direction in an arc movement as the traveler 23 moves from left to right. The same is true of the rotation of pivot 26 about pivot 30. Similarly, while pivot 24 is rotating about pivot 28 in a counterclockwise direction, pivot 16 is rotating about pivot 28 in a clockwise direction. Any means which will maintain equal the number of degrees of opposite arc rotation of the pivots 16 and 24 about the pivot 28 will maintain the swinging parallelograms in proper relationship and will insure that the traveler 23 moves in a straight line with respect to the base 15.

In the device 10 of FIG. 1, the means to maintain the number of degrees of opposite arc rotation the same for each pivot about each corresponding pivot constitutes a pair of bars 33 and 35 which are pivotally connected to a sliding pin 25 which moves in the slot 27 of the rod 32. The bars 33 and 35 are connected, respectively, at their ends opposite from the pin 25 to the arms 22 and 14 at the pivots 36 and 40, respectively. The pivots 36 and 40 are each spaced equidistant from the pivot 30 and the bars 33 and 35 are of equal length. The position of the bars 33 and 35 and the pivots 36 and 40 is shown in phantom when the traveler 23 is moved from the position illustrated to a position to the right of the base 15.

Figure 2:
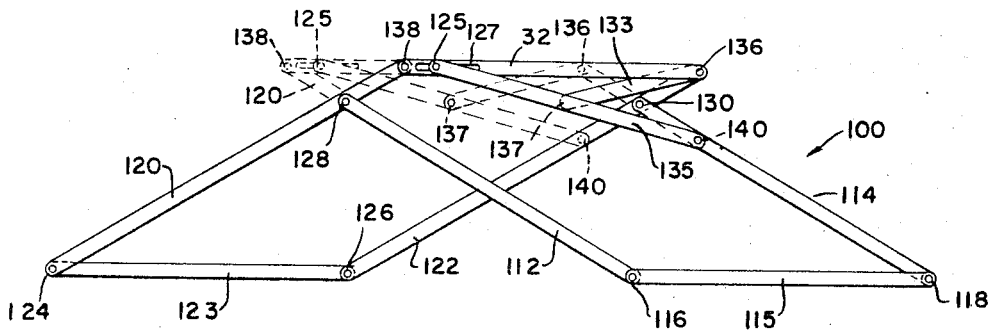
FIG. 2 is a front elevational view of another embodiment of the present invention.

The device 100 of FIG. 2 is in many ways similar to the device 10 of FIG. 1 and comprises, as elements of a first parallelogram, an arm 112, a base 115, an arm 114, connected by pivots 116 and 118 and an imaginary fourth side defined by two corresponding pivot points 128 and 130. The second swinging parallelogram is defined by the same imaginary fourth side along which the pivots 128 and 130 lie, as well as the arms 120 and 122 which are each connected to a traveler 123 at the pivots 124 and 126, respectively.

In the device 100, the means to maintain the number of degrees of opposite arc rotation the same for each pivot, such as pivot 126 and pivot 118, about each corresponding pivot, pivot 130, comprises a rod 132 having a slot 127 therein, which rod 132 is pivoted to the arms 120 and 122 along pivot points 138 and 136, respectively. Also extending from the pivot 136 is a bar 133 which is connected to a bar 135 at a pivot 137. The bar 135 is connected to the arm 114 at a pivot 140 and is pivotally connected at its other end to a pin 125 which slides in the slot 127. As in the device 10 of FIG. 1, the pivots 136 and 140 are spaced equidistant from the pivot 130 and the pivot 137 is also spaced equidistant from the pivots 136 and 140.

Figure 5:
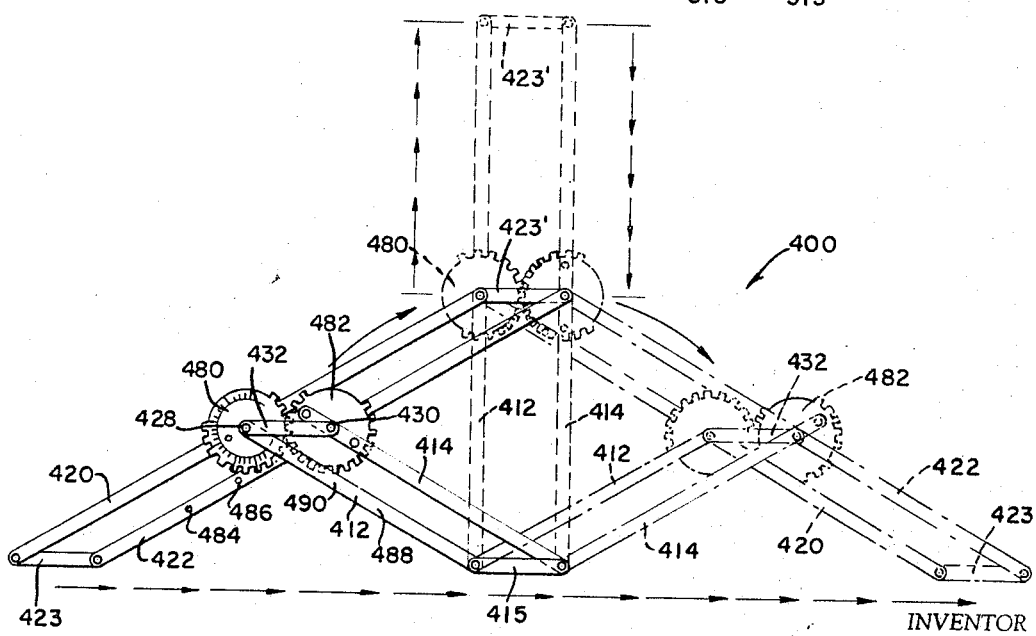
FIG. 5 is a front elevation of a fifth embodiment in accordance with the present invention, somewhat analogous to the embodiment of FIG. 4.

As the traveler 123 moves from the position shown to a position to the right of the base 115 in a straight line, the various elements will take the position shown in phantom. In actual use, however, the device will move as shown in FIGS. 5 and 10 of my parent application, Ser. No. 469,175.

Figure 3:
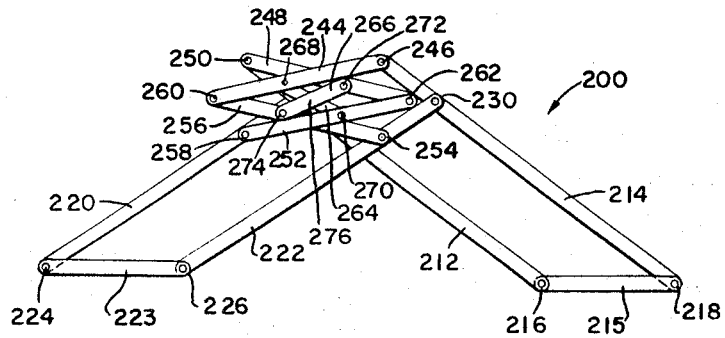
FIG. 3 is a front elevation of a third embodiment in accordance with the present invention.

With respect to FIG. 3, the device 200 illustrated is somewhat analogous to the device of FIG. 5 of my parent application, Ser. No. 469,175. Thus, arms 212 and 214 form the opposite sides of a first swinging parallelogram having four corners defined by the pivots 216, 228, 230, and 218, which has a third side a base 215; and the arms 220 and 222 form opposite sides of a second swinging parallelogram having four corners defined by the pivots 224, 228, 230 and 226. These two swinging parallelograms each have an imaginary side between the pivots 228 and 230 which is common to both parallelograms. The third side of the second parallelogram is, of course, a traveler 223. In the FIG. 3 illustration, the pivot 228 is hidden behind the means to maintain equal degree of swinging. As with the other embodiments, it may be noted that as the traveler 223 moves from left to right, the first parallelogram will swing in a clockwise direction while the second parallelogram swings in a counterclockwise direction.

In the device 200, means to maintain equal swinging is identical to the device used in the embodiment of FIGS. 1 and 5 in the parent application, Ser. No. 469,175, to maintain the spacing rods in aligned relationship or co-extensive. Such means comprises a bar 244 pivotally mounted to the arm 214 at a pivot 246. A second bar 248 is mounted on the arm 212 at a pivot 250. The distance between the pivots 246 and 250 is equal to the distance between the pivots 216 and 218 and the pivots 228 and 230. The bars 248 and 244 are inclined in opposite directions and cross each other to form an X-shape. In the same manner that the bars 244 and 248 are pivotally attached to the arms 214 and 212, respectively, so are two bars 252 and 256 attached to the arms 220 and 222 of the other parallelogram at the pivots 254 and 258, respectively, and the bars 252 and 256 form a mirror image of the bars 244 and 248. The bar 244 is pivotally connected to the bar 256 at a pivot 260 to tie the bars 244 and 256 together in a side-facing V shape. Similarly, the bars 248 and 252 are connected by a pivot 262 which forms the vertex of a V which lies in an opposite direction and facing the V formed by the bars 244 and 256. The bars 256, 252, 248 and 244 are all of equal length between their pivots.

To maintain the vertices of the V angles, namely, the pivots 260 and 262, in a horizontal line so that they move only towards and away from one another, it is necessary to utilize some type of tying linkage, a number of such tying linkages being possible. The linkage illustrated in FIG. 3 comprises a tying link 264 and a tying link 266, both of which are equal in length and pivotally mounted on each of two opposite bars. Thus, the link 264 is pivotally mounted between the bars 244 and 252 via a pivot 268 on the bar 244 and a pivot 270 on the bar 252; and the link 266 is pivotally mounted between the bars 248 and 256 via a pivot 272 on the bar 248 and a pivot 274 on the bar 256. In addition, it may be desirable, but it is not necessary, to provide a pivot 276 tying the centers of the two links 264 and 266.

As with the other embodiments, the movement of the device 200 may be ascertained by reference to FIGS. 5 and 10 of my parent application, Ser. No. 469,175.

Figure 4:
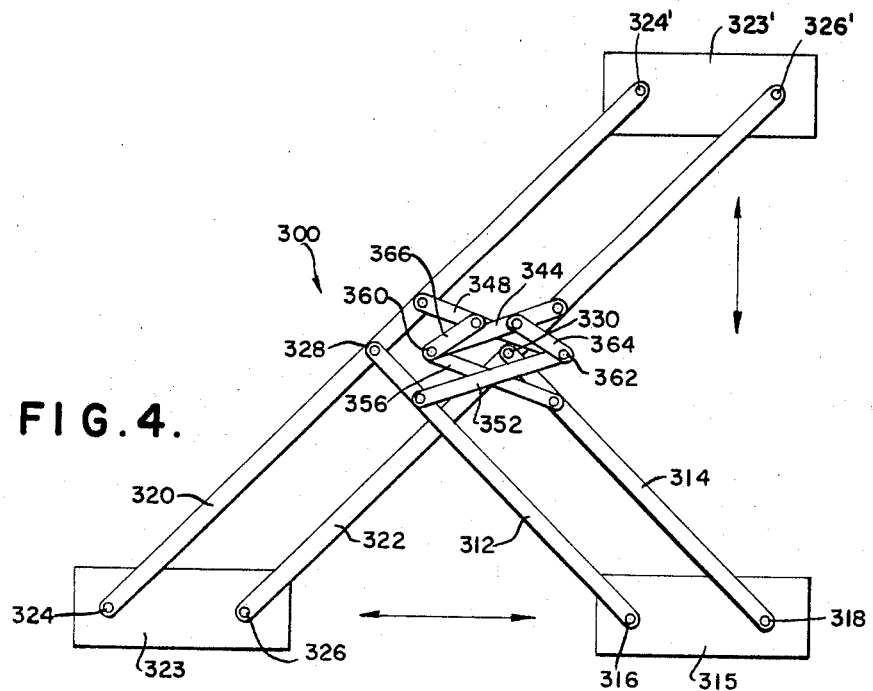
FIG. 4 is a front elevation of a fourth embodiment of the present invention.

Device No. 300, shown in FIG. 4, may be useful in supporting scaffolding at variable heights. The device of FIG. 7, described below, may find similar use.

Device 300 comprises a first arm 312 and a second arm 314, both mounted on a base member 315 via pivots 316 and 318, respectively. A third arm 320 and a fourth arm 322 are pivotally mounted to a first traveler 323 via pivot points 324 and 326, respectively. At the opposite ends of arms 320 and 322 is provided a sound traveler 323' pivotally connected to such arms at the pivot points 324' and 326', respectively. As with the device 200 of FIG. 3, the fourth side of the two swinging parallelograms is imaginary and is defined by the pivots 328 and 330. The upwardly extending portions of the arms 320 and 322, along with the traveler 323', forms a third swinging parallelogram which is 180° from and swings along with and in the same direction (e.g. clockwise) as the parallelogram formed by arms 320 and 322 and traveler 323. As the traveler 323 moves in a straight horizontal line toward the base 315, the traveler 323' will move in a straight line vertically above and away from the base 315; as the traveler 323 moves horizontally away from the base 315, the traveler 323' will move vertically downwardly toward the base 315. For use in supporting scaffolding, the traveler 323 could be provided with wheels while the traveler 323' were to support or consist of the scaffolding.

In the device 300 of FIG. 4, the "means to maintain the number of degrees of opposite arc rotation the same for each pivot about each corresponding pivot" comprises a bar arrangement similar to that described above in relation to the device 200 of FIG. 3. Thus, a pair of bars 348 and 352 form a first side facing V shape. A second pair of bars 344 and 356 form a second side facing V shape. As in the device 200 of FIG. 3, the vertices of these side facing V shapes, defined by the pivots 360 and 362 must be maintained in a straight line and must only move towards and away from each other as the travelers move; this relationship is maintained by the links 364 and 366, both of which are relocated from the position shown in device 200 of FIG. 3. Thus, the link 366, equal in length to link 364, is connected to the bar 356 at the pivot 360; similarly, the link 364 is connected to the bar 352 at the link 362.

Noting FIG. 5, a device 400 is shown which is similar to the device 300 of FIG. 4 except that it has a different means to maintain the number of degrees of opposite arc rotation the same for each pivot about each corresponding pivot. As with device 300 of FIG. 4, the device 400 may be used to support scaffolding or it may be used as a gauge or mathematical instrument.

In the device 400, a first parallelogram is formed by a base 415, a pair of parallel arms 412 and 414 pivoted to such base, and a rod 432 pivotally mounted on the two arms 412 and 414, the rod 432 serving as the fourth side of the first parallelogram. A second parallelogram is formed by the first traveler 423, two parallel arms 420 and 422 pivotally mounted thereon, and the rod 432 also being pivotally mounted on the arms 420 and 422. A third parallelogram, similar to the third parallelogram of the device 300 of FIG. 4, is formed by the fourth side, i.e., rod 432, the extensions of arms 420 and 422 and a second and vertical traveler 423'. The up-and-down movement of the vertical traveler 423' can be seen in phantom as the horizontal traveler 423 moves from the left of the base 415 to the right thereof as shown in phantom.

In device 400, the means to maintain the number of degrees of opposite arc rotation the same for each pivot about each corresponding pivot constitutes a pair of cog wheels or gear members; this constitutes a preferred embodiment of such means since it provides a simplified structure over the other structures set forth. The cog wheels 480 and 482 by interlocking with one another serve to maintain the arms in proper alignment. Since the gear wheels are the same in size and number of teeth, the parallelograms are thereby forced to swing properly in relation to one another. The corresponding pivots 428 and 430 are thereby maintained in the proper straight line relationship of one to the other and the rotation of arm 420, for example, about its pivot axis 428 the same number of degrees, although in the opposite direction, as the rotation of the arm 412 about the same pivot axis 428. It is also necessary that the cog wheels 480 and 482 be adequately anchored, one to one parallelogram and the other to the other parallelogram; therefore, the cog wheel 482 is rigidly anchored to the arm 414 in any suitable manner such as by screws or bolts and the cog wheel 480 is anchored in any suitable manner to the arm 420 in a similar manner.

In certain uses, it may be desirable that the cog wheel 480 be marked along its edge with suitable indicia as shown which may show degrees for indicating a particular angle of rotation or which may provide a calibration for reading the linear distance of travel in a straight line of the traveler 423 and/or 423'. The calibrated cog wheel 480 is particularly usfeul where the device 400 is used as a gauge or mathematical instrument. Where the device is used primarily as an "elevator" with regard to traveler 423', it may be desirable to lock the device 400 with the traveler 423' at a desired height; a variety of means may be utilized to accomplish this result, e.g., holes 484 and 486 in arm 422 and holes 488 and 490 in arm 412, so that when holes 486 and 490 become aligned a pin may be passed therethrough to lock the device 400 in position. Similarly, when holes 484 and 488 become aligned a pin may be passed therethrough to lock the device 400 in a different position.

Noting FIG. 6, it may be seen that the embodiment 500 utilizes a pair of oppositely swinging parallelograms which are not equal in size. Thus, the device 500 comprises a base 515 to which is connected a pair of parallel arms 512 and 514 via pivots 516 and 518, respectively. These elements form a first parallelogram having a fourth side which constitutes a rod 532 connected to the arm 512 at the pivot 528 and to the arm 514 at the pivot 530. The second parallelogram is formed by traveler 523 to which is connected a pair of parallel arms 520 and 522 via the pivots 524 and 526, respectively. As can be seen by inspection, the distance between the parallel arms 520 and 522 is less than the distance between the parallel arms 512 and 514 and, hence, although the rod 532 forms the fourth side of the second parallelogram, the arm 520 cannot be connected to such rod 532 at the pivot 528; accordingly, the rod 532 forming the fourth side of the second parallelogram is attached to the arm 522 at the pivot 530 and to the arm 520 at a pivot 528'.

As in the device 400 shown in FIG. 5, the device 500 utilizes a pair of cog wheels 580 and 582 as the means to maintain the number of degrees of opposite arc rotation for each pivot, such as pivots 518 and 526, about each corresponding pivot, the pivot 530, the same. The particular construction of these cog wheels is not critical and they may be formed of any material such as metal or plastic, but it is necessary that the cog wheel 580 be anchored to one parallelogram through the arm 512 and that the other cog wheel 582 be anchored to the other parallelogram such as through the arm 520.

Figure 7:
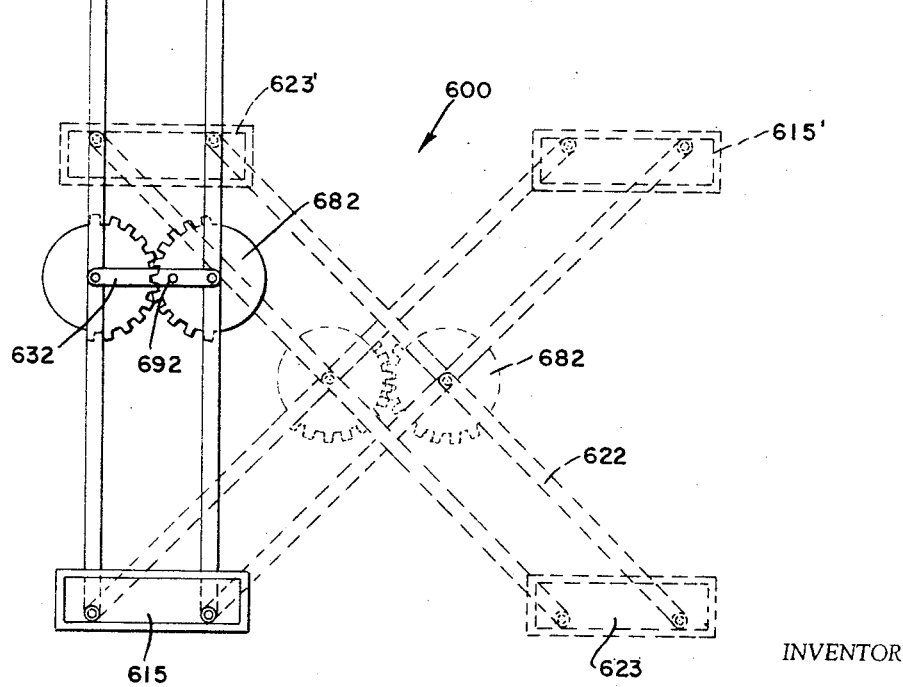
FIG. 7 is a front elevational view of a seventh embodiment in accordance with the present invention.

Going to FIG. 7, it may be seen that the device 600 is in many respects analogous to the device 400 of FIG. 5. As with the device 400, the device 600 may be used as an elevator or as a mathematical instrument of some type, if desired. The device 600 differs from the device 400 by the utilization of four, rather than two or three, parallelograms. Such a device comprises not only a base 615 and a horizontal carrier 623, but a vertical carrier 623' and a third carrier 615' which moves both horizontally and vertically. The operation and structure of this device will be readily apparent upon inspection of FIG. 7 and by analogy with the other embodiments. The device 600 utilizes, however, in contrast to device 400 of FIG. 5, a set screw 692 placed along the length of the rod 632 as a stopping element. Thus, as the travelers 623 moves to the right away from the base 615 to the position shown in phantom, the cog wheel 682, being firmly anchored to the arm 622, will rotate counterclockwise with respect to the rod 632. Therefore, the device may be anchored in any position by turning the set screw 692, carried by the rod 632, until it frictionally engages the cog wheel 682 to prevent any relative motion between the cog wheel 682 and the rod 632.

The principle of the present invention resides in maintaining the sliding motion of the parallelograms in different directions in such a way that one cannot move unless the other one moves in the opposite direction; and the amount and speed of movement is identical in each in the sense that the degrees of rotation are the same. In each case when such parallelograms are provided, it is necessary to provide means to hold the arc movements in aligned relationship, in exact ratio, one to the other. The general principle is described in some greater detail in my parent application, Ser. No. 469,175.

Devices in accordance with the present invention are adapted for a variety of uses; thus, anything that is required to travel in a straight line with respect to something else can make use of the present invention. The devices may take the places of telescoping devices, slides, bearings, tracks, "lazy-tong" devices, etc., and one practical use is described in my co-pending application, Ser. No. 419,347, filed Dec. 18, 1964. In addition, the devices of the present invention may be used as mathematical instruments and as elevating means, such as for the support of scaffolding.

The devices of the present invention have less friction play than a slide, are more satisfactory than rollers if the distance of travel is sufficient and, unlike rollers, the present device ties the traveler to the base and the device is not limited to a track or housing for length of movement. The device performs a true straight line expansion for its entire distance of travel. It can be mounted to two objects to be moved in a straight line with no other mounted point or support.

The swing of the device from one side to the other side gives it a triple action which greatly extends the length of movement. The straight line carrier device has a double action: i.e., the sides of parallelograms traverse to either side in relation of one to the other; the complete device swings in relation to movement of objects from one extreme of its arc movement to the other extreme, which action moves the common axis of parallelograms from one side to the other side of this arc movement, and in effect this again doubles the length of movement in relation to the original position of this unit.

One advantage of this straight line carrier device is an aberration whereas in moving an object in relation to a stationary object the straight line movement can be altered to an elliptic line of movement, due to the swing of the parallelograms, wherein the swing of the parallelograms would change the arc of a circle movement to an elongated arc. This could be caused in the installation of the device, or in construction of the device, by placing mounting pivots at a greater distance from common axis for one parallelogram than for the second parallelogram. For instance a door could be installed to contact the floor when closed and by the lift of the elliptic movement it would not drag in transit from one side to the other side.

In certain devices, such as the devices of FIGS. 5 and 7, it may be desirable to utilize a particular strengthening device including a reciprocating pin extending perpendicularly between the base 415 and the traveler 423', e.g. a pin may extend upwardly from the base and be received in a bearing housing on the vertically moving traveler.

It will be obvious to those skilled in the art that various changes may be made without departing from the spirit of the invention and, therefore, the invention is not limited to what is described in the specification but only as indicated in the appended claims. For example, it will be obvious that more than one straight-line device can be used in one environment. Similarly, to add strength to any particular straight-line device, more than one means to maintain equal the number of degrees of opposite arc rotation may be used.

What is claimed is:

1. A straight line carrier device, including a base and at least one traveler, comprising:

a first arm pivotally mounted on said base, a second arm pivotally mounted on said base parallel to said first arm and spaced apart therefrom, said first and second arm and said base forming three sides of a first parallelogram;

a third arm pivotally mounted on said traveler, a fourth arm pivotally mounted on said traveler parallel to said third arm and spaced apart therefrom, said third and fourth arm and said traveler forming three sides of a second parallelogram;

means to pivotally connect said first and second parallelograms at at least two corresponding pivots on said arms and along a fourth side of said parallelograms opposite said base and traveler to permit said parallelograms to change shape as said traveler moves in a straight line with respect to said base, each of said pivots on said base and traveler adjacent one end of each of said arms undergoing relative arcuate rotation about its corresponding pivot of its arm along the fourth side, the pivots on said base rotating clockwise about their corresponding pivots while the pivots on said traveler are rotating in an opposite arc rotation counterclockwise about their corresponding pivots and said base pivots rotating counterclockwise while said traveler pivots rotate clockwise; and means to maintain the number of degrees of opposite arc rotation the same for each pivot about each corresponding pivot including a slotted rod connecting said third and fourth arms and being pivotally connected thereto, a pin for travelling within said slotted rod, and a first bar connecting said pin to said second arm by means of a pivot.

2. A device in accordance with claim 1 wherein said slotted rod comprises the fourth side of said parallelogram, said means to maintain equal the number of degrees of opposite arc rotation further comprising a second bar pivotally connected to said fourth arm at one end thereof and to said pin at the other end thereof, said first and second bars being of equal length.

3. A device in accordance with claim 1 wherein said means to maintain equal the number of degrees of opposite arc rotation further comprises a second bar pivotally connecting said fourth arm to said first bar, said pivotal connection of said second bar to said fourth arm being the same as the pivotal connection of said slotted rod to said fourth arm, and said last-mentioned common pivot being spaced a distance from said corresponding pivots as said pivot of said first bar to said second arm.

4. A straight line carrier device, including a base and at least one traveler, comprising:
- a first arm pivotally mounted on said base, a second arm pivotally mounted on said base parallel to said first arm and spaced apart therefrom, said first and second arm and said base forming three sides of a first parallelogram;
- a third arm pivotally mounted on said traveler, a fourth arm pivotally mounted on said traveler parallel to said third arm and spaced apart therefrom, said third and fourth arm and said traveler forming three sides of a second parallelogram;
- means to pivotally connect said first and second parallelograms at at least two corresponding pivots on said arms and along a fourth side of said parallelograms opposite said base and traveler to permit said parallelograms to change shape as said traveler moves in a straight line with respect to said base, each of said pivots on said base and traveler adjacent one end of each of said arms undergoing relative arcuate rotation about its corresponding pivot of its arm along the fourth side, the pivots on said base rotating clockwise about their corresponding pivots while the pivots on said traveler are rotating in an opposite arc rotation counterclockwise about their corresponding pivots and said base pivots rotating counterclockwise while said traveler pivots rotate clockwise; and
- means to maintain the number of degrees of opposite arc rotation the same for each pivot about each corresponding pivot comprising a first bar pivotally mounted to said first arm, a second bar pivotally mounted to said second arm, a third bar pivotally mounted to said first bar and forming a first V therewith, a fourth bar pivotally mounted to said second bar and forming a second V therewith facing opposite to said first V, said third bar being pivotally mounted to said third arm and said fourth bar being pivotally mounted to said fourth arm, and linkage means pivotally tying said V's together to permit the pivots forming said V's to move only towards and away from each other in a straight line.

5. A straight line carrier device, including a base and at least two travelers, comprising:
- a first pair of arms including a first arm pivotally mounted on said base and a second arm pivotally mounted on said base parallel to said first arm and spaced apart therefrom, said first and second arm and said base forming three sides of a first parallelogram;
- a second pair of arms including a third arm pivotally mounted on a first of said two travelers and a fourth arm pivotally mounted on said first traveler parallel to said third arm and spaced apart therefrom, said third and fourth arm and said first traveler forming three sides of a second parallelogram;
- means to pivotally connect said first and second parallelograms at at least two corresponding pivots on said arms and along a fourth side of said parallelograms opposite said base and first traveler;
- a third pair of arms extending from said corresponding pivots and from the fourth side of said parallelograms in an opposite direction from said base and first traveler, said third pair of arms comprising spaced parallel arm extensions to form a third parallelogram having its fourth side common with said first and second parallelograms, and a second of said two travelers forming the first side of said third parallelogram;
- whereby said parallelograms change shape as said first traveler moves in a straight line with respect to said base and said second traveler moves in a straight line 90° to the movement of said first traveler, each of said pivots on said base and first traveler adjacent one end of each of said arms undergoing relative arcuate rotation about its corresponding pivot of its arm along the fourth side, the pivots on said base rotating clockwise about their corresponding pivots while the pivots on said first traveler are rotating in an opposite arc rotation counterclockwise about their corresponding pivots and said base pivots rotating counterclockwise while said traveler pivots rotate clockwise; and
- means to maintain the number of degrees of opposite arc rotation and the same for each pivot about each corresponding pivot.

6. A device in accordance with claim 5 wherein said third pair of arms comprise extensions of said third and fourth arms.

7. A device in accordance with claim 5 wherein said third pair of arms comprise extensions of said first and second arms, whereby the said second traveler will transcribe an arc movement in coextensive relation to said first traveler as said first traveler moves in a straight line.

8. A device in accordance with claim 5 wherein said means to maintain equal the number of degrees of opposite arc rotation the same for each pivot about each corresponding pivot comprises a first cog wheel at one of said corresponding pivots and anchored to one of said first and second arms, and an interlocking cog wheel at said second corresponding pivot and rigidly anchored to one of said third and fourth arms, said device further comprising means to maintain said cog wheels interlocked.

9. A straight line carrier device, including a base and three travelers, comprising:
- a first arm pivotally mounted on said base, a second arm pivotally mounted on said base parallel to said first arm and spaced apart therefrom, said first and second arm and said base forming three sides of a first parallelogram;
- a third arm pivotally mounted on a first of said three travelers, a fourth arm pivotally mounted on said first traveler parallel to said first third arm and spaced apart therefrom, said third and fourth arm and said first traveler forming three sides of a second parallelogram;
- means to pivotally connect said first and second parallelograms at at least two corresponding pivots on said arms and along a fourth side of said parallelograms opposite said base and first traveler;
- said first and second arms extending from the fourth side of said parallelograms in an opposite direction from said base to form a third parallelogram, a second of said three travelers forming the first side of said third parallelogram;
- said third and fourth arms extending from the fourth side of said parallelograms in an opposite direction from said first traveler to form a fourth parallelogram, and a third of said three travelers forming the first side of said fourth parallelogram;
- whereby said parallelograms change shape as said first traveler moves in a straight line with respect to said base, each of said pivots on said base and first traveler adjacent one end of each of said arms undergoing relative arcuate rotation about its corresponding pivot of its arm along the fourth side, the pivots on said base rotating clockwise about their corresponding pivots while the pivots on said first traveler are rotating in an opposite arc rotation countercurrent about their corresponding pivots and said base pivots rotating counterclockwise while said traveler pivots rotate clockwise, and whereby the resultant movement will sustain the four extreme ends of said device in the form of a rectangle as the relative dimensions are progressively altered; and
- means to maintain a number of degrees of opposite arc rotation the same for each pivot about each corresponding pivot.

(References on following page)

References Cited

UNITED STATES PATENTS

| | | | |
|---|---|---|---|
| 521,256 | 6/1894 | Browne | 248—404 |
| 1,070,524 | 8/1913 | Pieper | 248—281 |
| 2,256,004 | 9/1941 | Thomas | 108—137 X |
| 2,597,861 | 5/1952 | Gerlach | 248—277 X |

FOREIGN PATENTS

| | | |
|---|---|---|
| 126,603 | 6/1944 | Australia. |
| 210,712 | 8/1960 | Austria. |
| 1,069,974 | 11/1959 | Germany. |

CHANCELLOR E. HARRIS, *Primary Examiner.*

FRANK DOMOTOR, *Assistant Examiner.*

U.S. Cl. X.R.

74—103, 105